United States Patent
Dowty et al.

(10) Patent No.: US 7,393,167 B2
(45) Date of Patent: Jul. 1, 2008

(54) LOAD-LIMITING AND ENERGY-DISSIPATING MOUNT FOR VEHICLE SEATING

(75) Inventors: Mark Brian Dowty, Rural Hall, NC (US); Tracy Neal Pence, Winston-Salem, NC (US)

(73) Assignee: BE Aerospace, Inc., Wellington, FL (US)

( * ) Notice: Subject to any disclaimer, the term of this patent is extended or adjusted under 35 U.S.C. 154(b) by 267 days.

(21) Appl. No.: 11/131,118

(22) Filed: May 17, 2005

(65) Prior Publication Data

US 2006/0263164 A1 Nov. 23, 2006

(51) Int. Cl.
*B61D 45/00* (2006.01)
(52) U.S. Cl. ..................................... 410/105
(58) Field of Classification Search ............... 410/105; 296/68.1; 297/216.1, 216.16, 216.19
See application file for complete search history.

(56) References Cited

U.S. PATENT DOCUMENTS

| | | | | |
|---|---|---|---|---|
| 2,227,717 A | * | 1/1941 | Jones | 297/302.4 |
| 3,282,229 A | | 11/1966 | Elsner | |
| 3,524,678 A | * | 8/1970 | Lavenne | 297/216.2 |
| 3,620,171 A | | 11/1971 | Brenia et al. | |
| 3,627,345 A | * | 12/1971 | Le Mire | 280/777 |
| 3,719,156 A | | 3/1973 | Broling | |
| 4,026,218 A | | 5/1977 | Prete, Jr. et al. | |
| 4,062,298 A | | 12/1977 | Weik | |
| 4,230,432 A | | 10/1980 | Howell | |
| 4,256,424 A | | 3/1981 | Knox et al. | |
| 4,449,875 A | | 5/1984 | Brunelle | |
| 4,487,383 A | * | 12/1984 | Mazelsky | 244/122 R |
| 4,496,271 A | | 1/1985 | Spinosa et al. | |
| 4,509,888 A | | 4/1985 | Sheek | |
| 4,708,549 A | | 11/1987 | Jensen | |
| 4,776,533 A | | 10/1988 | Sheek et al. | |
| 4,861,103 A | * | 8/1989 | Vallee | 297/216.2 |
| 4,932,816 A | | 6/1990 | Ligensa | |
| 5,152,578 A | * | 10/1992 | Kiguchi | 297/216.16 |
| 5,169,091 A | | 12/1992 | Beroth | |
| 5,183,313 A | | 2/1993 | Cunningham | |
| 5,489,172 A | | 2/1996 | Michler | |
| 5,564,654 A | | 10/1996 | Nordstrom | |
| 5,597,055 A | * | 1/1997 | Han et al. | 188/371 |
| 5,730,492 A | * | 3/1998 | Warrick et al. | 297/216.2 |
| 5,765,978 A | | 6/1998 | Looker et al. | |
| 5,871,318 A | | 2/1999 | Dixon et al. | |
| 6,142,564 A | * | 11/2000 | Pajela et al. | 297/216.18 |
| 6,193,297 B1 | * | 2/2001 | Vandermolen | 296/68.1 |
| 6,257,663 B1 | * | 7/2001 | Swierczewski | 297/216.19 |
| 6,334,643 B1 | * | 1/2002 | Lindblad et al. | 296/65.09 |
| 6,406,092 B1 | * | 6/2002 | Cordes et al. | 297/216.16 |
| 6,416,127 B1 | * | 7/2002 | Galbreath et al. | 297/216.13 |

(Continued)

*Primary Examiner*—H Gutman
(74) *Attorney, Agent, or Firm*—Adams Intellectual Property Law, P.A.

(57) ABSTRACT

A passenger seat for a vehicle is mounted by an extendible stud assembly which includes a housing attached to the seat; and a movable plunger carried by the housing and including a locking stud adapted for engaging a locking track. The housing is constructed such that movement of the stud relative to the housing under an applied load causes deformation of the housing which resists the motion. This controlled motion of the locking stud allows a deck of the aircraft to deform under crash loads without imposing excessive loads on the passenger seat.

23 Claims, 13 Drawing Sheets

U.S. PATENT DOCUMENTS 6,565,151 B2 * 5/2003 Jarnail et al. ........... 297/216.16
6,789,988 B1    9/2004 Moradians 2006/0220426 A1 * 10/2006 Moffatt et al. ......... 297/216.19

* cited by examiner

LOAD-LIMITING AND ENERGY-DISSIPATING MOUNT FOR VEHICLE SEATING

BACKGROUND OF THE INVENTION

This invention relates generally to vehicle seating and more particularly to an energy-dissipating mounting apparatus for aircraft seating.

Aircraft passenger seating must be able to retain its structural integrity under various crash loads to protect the passengers seated therein, and must be able to pass certification testing which simulates such loads. The deck of an aircraft cabin to which seat units are mounted is relatively flexible, while the seating units themselves are relatively rigid, especially newer units which may be constructed from materials such as carbon-fiber composites.

During the early stages of a crash, the aircraft structure, including the relatively flexible deck, tends to deform in a "rolling" or twisting mode. As the deck is deformed, it tends to separate from a seat mounting, which can leave the seat unit to move uncontrollably, or if it remains attached to impose unacceptable loads on the passenger seats which can cause them to fail. Furthermore, the rigid mounting of a rigid seat unit to an aircraft deck provides little energy-dissipating capability in the event of a crash.

BRIEF SUMMARY OF THE INVENTION

Therefore, it is an object of the invention to provide a passenger seat mounting system which allows the seat to remain attached even as the deck of the aircraft deforms during a crash.

It is another object of the invention to provide a passenger seat mounting system which dissipates energy during a crash.

It is another object of the invention to provide a seat mounting system which relieves loads on a seat unit as an aircraft deck deforms.

These and other objects of the present invention are achieved in the preferred embodiments disclosed below by providing a stud assembly for a passenger seat including: a housing for being attached to the seat; and a movable plunger carried by the housing and including a locking stud adapted for engaging a locking track. The housing is constructed such that motion of the stud relative to the housing under an applied load causes deformation of the housing which resists the movement.

According to another embodiment of the invention, the stud assembly further includes a shear pin which engages the housing and the plunger to prevent motion of the plunger. The material and dimensions of the shear pin are selected to permit failure thereof at a predetermined load greater than a load required to cause deformation of the housing.

According to another embodiment of the invention, the material and dimensions of the shear pin are selected to fail at a load of about 400 Kg.

According to another embodiment of the invention, the housing includes an elongated hollow member having a sidewall with a closed top end and an open bottom end; and an upper end of the plunger is attached to the housing.

According to another embodiment of the invention, the top end of the housing includes at least one generally conical portion connected to a substantially flat portion which contacts the plunger.

According to another embodiment of the invention, the housing includes an elongated hollow member having a sidewall with an open top rim and an open bottom end; and the plunger has upper and lower ends and an enlarged head disposed at the upper end, wherein a portion of the plunger is received inside the housing, and the head is disposed above the top rim.

According to another embodiment of the invention, the head has a outside diameter greater than an inside diameter of the housing.

According to another embodiment of the invention, the stud assembly further includes means for preventing motion of the plunger outside of a predetermined range.

According to another embodiment of the invention, the stud assembly further includes a stop pin attached to the housing and received in an elongated slot in the plunger, such that the stop pin allows motion of the plunger within a predetermined range, and prevents motion of the plunger beyond the predetermined range.

According to another embodiment of the invention, a passenger seat includes a frame including a pair of spaced-apart legs for being attached to a deck of a vehicle; an upwardly-extending seat back carried by the frame; a seat bottom for supporting a passenger; and means for attaching the legs to the deck, the means permitting limited displacement of the seat relative to the deck.

According to another embodiment of the invention, the means for attaching the legs to the deck include: a track fastener attached to a first end of each of the legs, each of the track fasteners including a downwardly-projecting locking stud adapted to engage a locking track; and an extendible stud carried by a second end of each of the legs, each of the extendible studs adapted to engage a locking track, wherein each of the studs is mounted for controlled movement in and out of its respective leg.

According to another embodiment of the invention, the extendible stud includes: a movable plunger carried by the housing and including a locking stud adapted for engaging a locking track. The housing is constructed such that extension of the stud from the housing under an applied load causes deformation of the housing so as to resist the extension.

BRIEF DESCRIPTION OF THE DRAWINGS

The subject matter that is regarded as the invention may be best understood by reference to the following description taken in conjunction with the accompanying drawing figures in which.

DETAILED DESCRIPTION OF THE INVENTION

Figure 1:
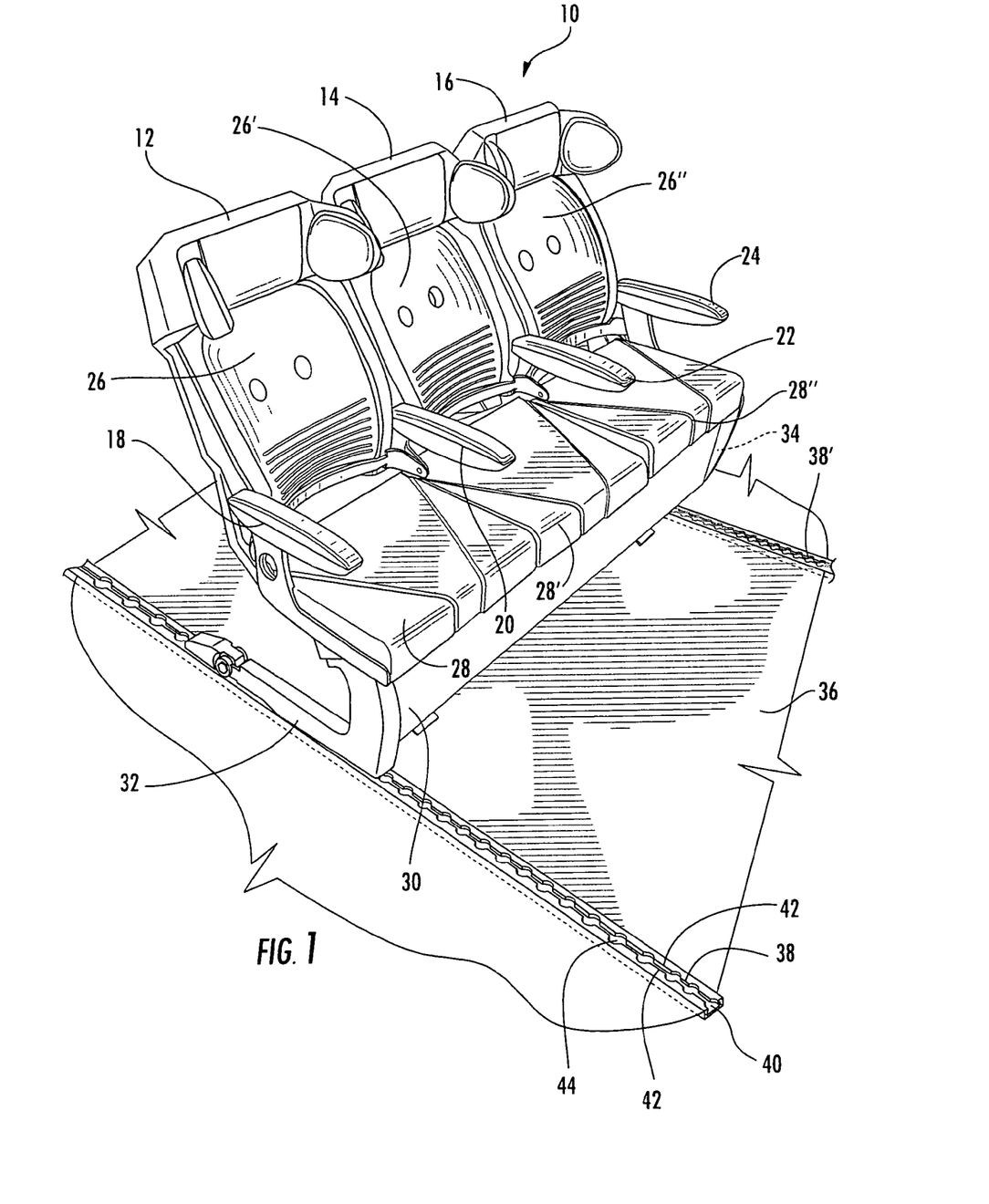
FIG. 1 is a perspective view of a passenger seat set attached to an aircraft deck.

Referring to the drawings wherein identical reference numerals denote the same elements throughout the various views, FIG. 1 illustrates a passenger seat set 10. The seat set 10 includes three seats 12, 14, and 16 which are collectively provided with four arm rests 18, 20, 22, and 24 each shown in the lowered passenger use position. The seats include seat backs 26, 26', and 26", and seat bottoms 28, 28", and 28"'. The seats 12, 14, and 16 are supported by a frame 30 mounted on legs 32 and 34, which are in turn mounted to the deck 36 of the aircraft by track fittings, described in more detail below. In the illustrated example, the frame 30 and legs 32 and 34 are constructed from a material such as carbon-fiber composite. It will be understood that the mounting system described herein is equally applicable to seat sets having more or fewer seats than the seat set 10, as well as to individual seats, and to seats or seat seats having greater or fewer numbers of legs.

The deck 36 has a pair of longitudinally-extending locking tracks 38 and 38' of a known type attached thereto. The locking tracks 38 and 38' are identical and only the locking track 38 will be described in detail. The locking track 38 has a longitudinally-extending slot 40 therein which extends along the entire length of the locking track 38. Upper walls 42 of the locking track 38 define the slot 40 having regularly spaced-apart enlarged openings 44 along the length thereof. The locking track 38 is securely attached to the deck 36 of the aircraft, for example by machine screws (not shown).

Figure 2:
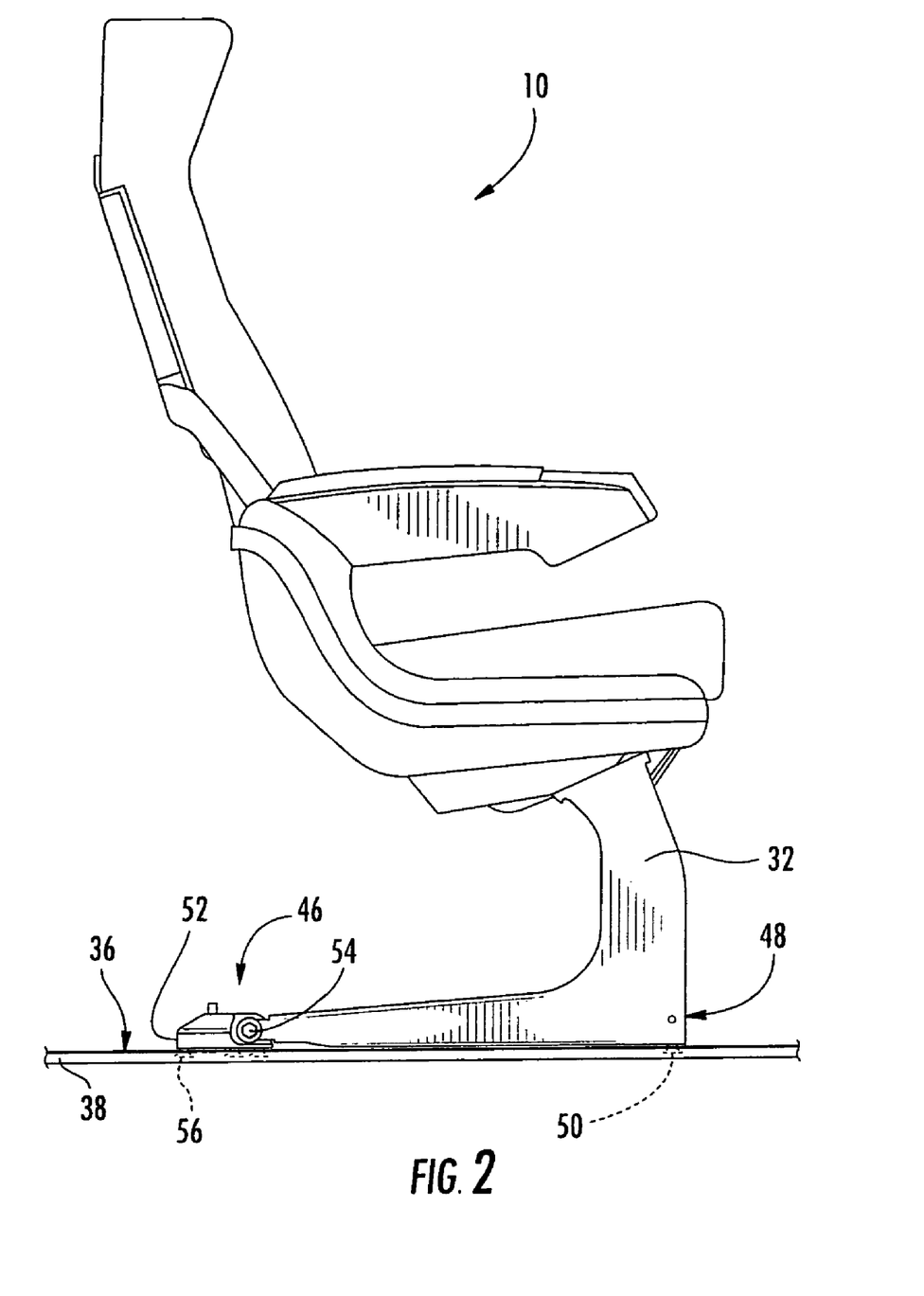
FIG. 2 is a side view of the seat set of FIG. 1.
Figure 3:
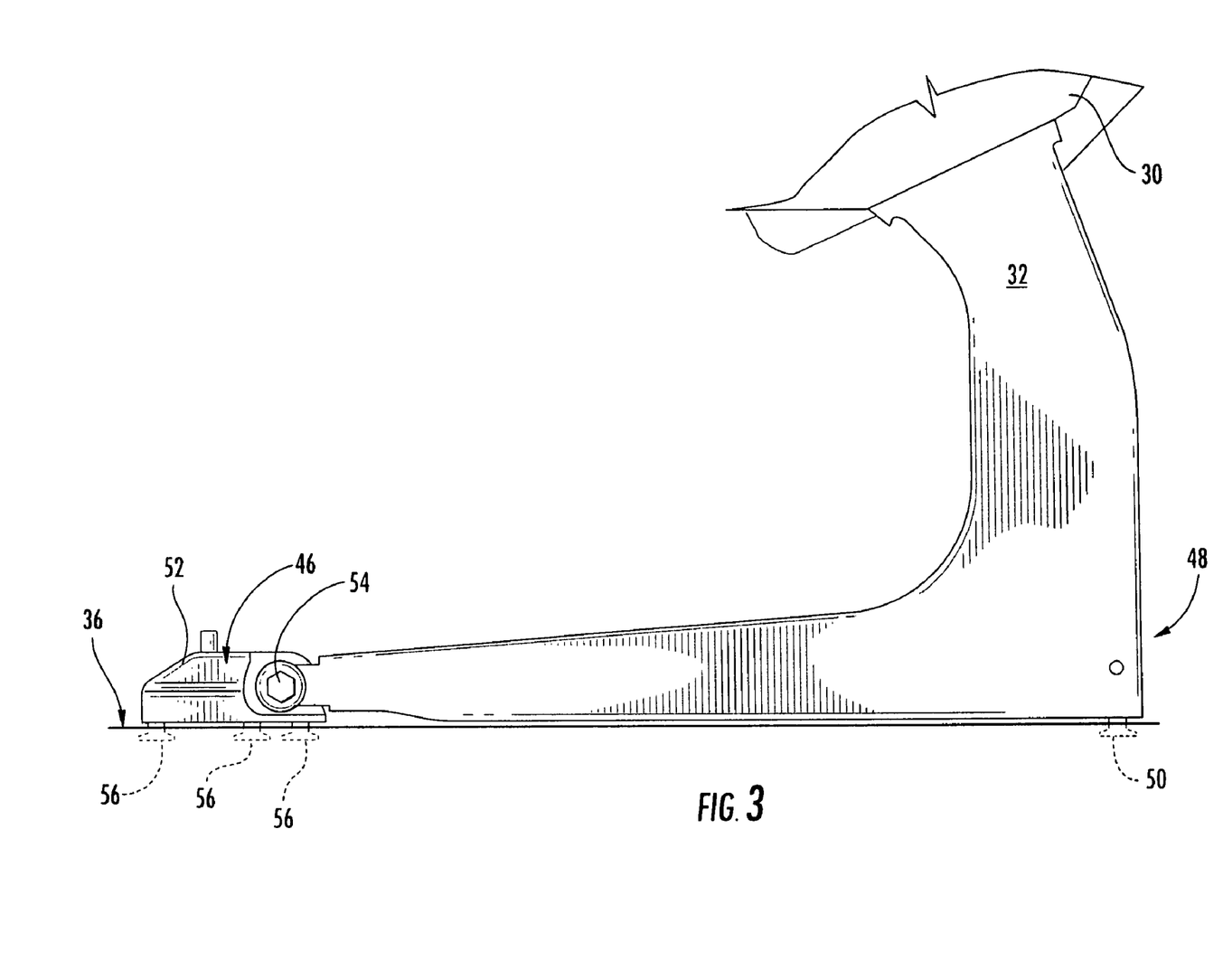
FIG. 3 is an enlarged side view of the seat of FIG. 1 in a pre-crash condition.

FIGS. 2 and 3 depict a the leg 32 of the seat set 10 in its installed or "pre-crash" condition. The leg 32 is mounted to the locking track 38 at its aft end by a track fastener assembly 46 and at its forward end by an extendible stud assembly 48 including a front stud 50, respectively. The leg 34 is mounted to the locking track 38' by an identical track fastener assembly and extendible front stud assembly, which are not described in detail. The track fastener assembly 46 includes a base 52 which is mounted to the leg 32. In the illustrated example the base 52 is pivotable relative to the leg 32 in a vertical plane about a bolt 54. The base 52 carries one or more downward-projecting locking studs 56 of a known type, each including a shaft and a circular mushroom head. These locking studs 56 are adapted to engage the locking track 38 and secure the base 52 thereto. Depending upon the particular application, the base 52 may include means to facilitate the installation and removal of the seat set 10. For example the locking studs 56 may be adjustable, or they may be moveable between locked and unlocked positions. The front stud 50 also has a circular mushroom head which engages the locking track 38.

Figure 4:
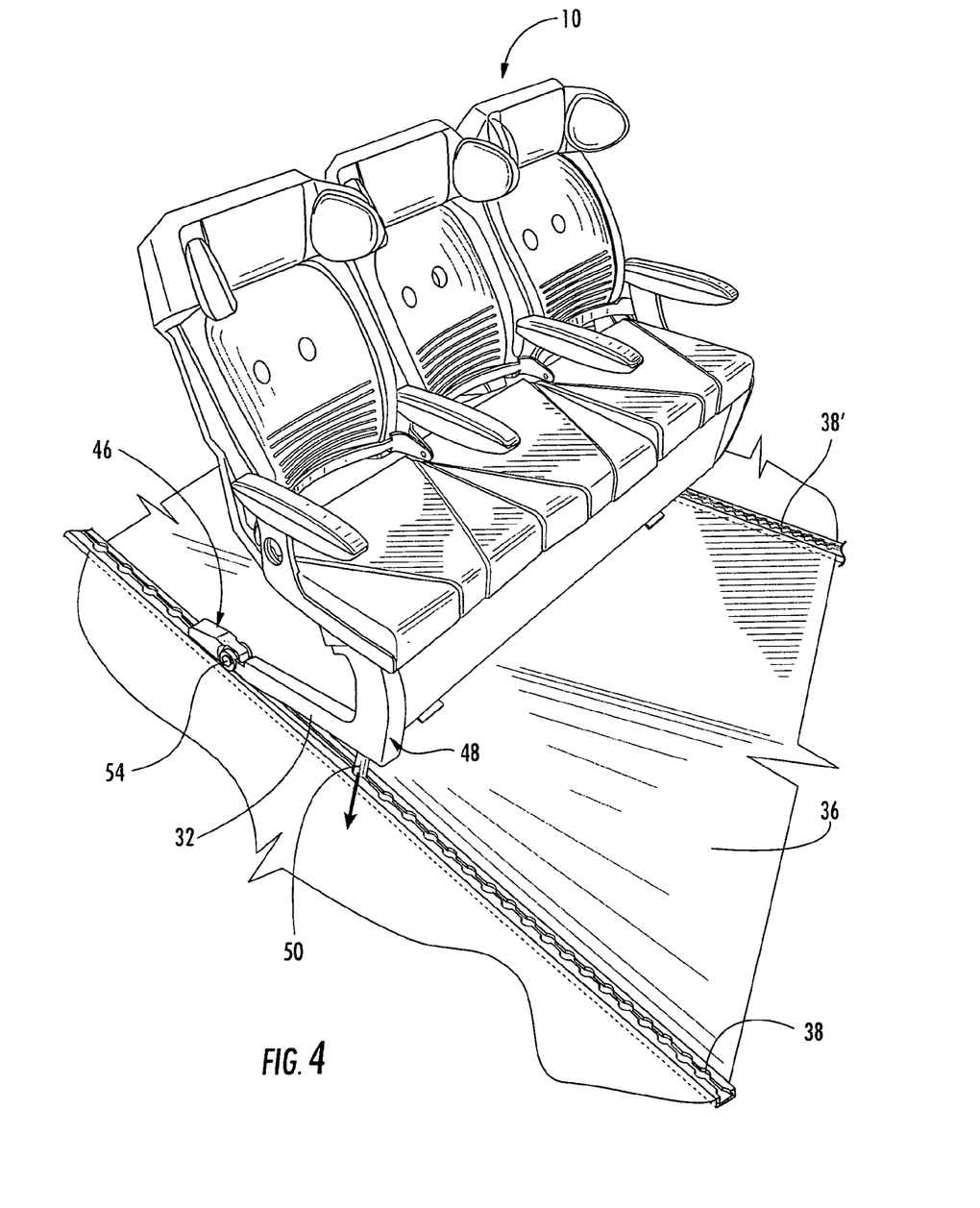
FIG. 4 is a perspective view of the passenger seat set and aircraft deck of FIG. 1 with the deck in a deformed condition.
Figure 5:
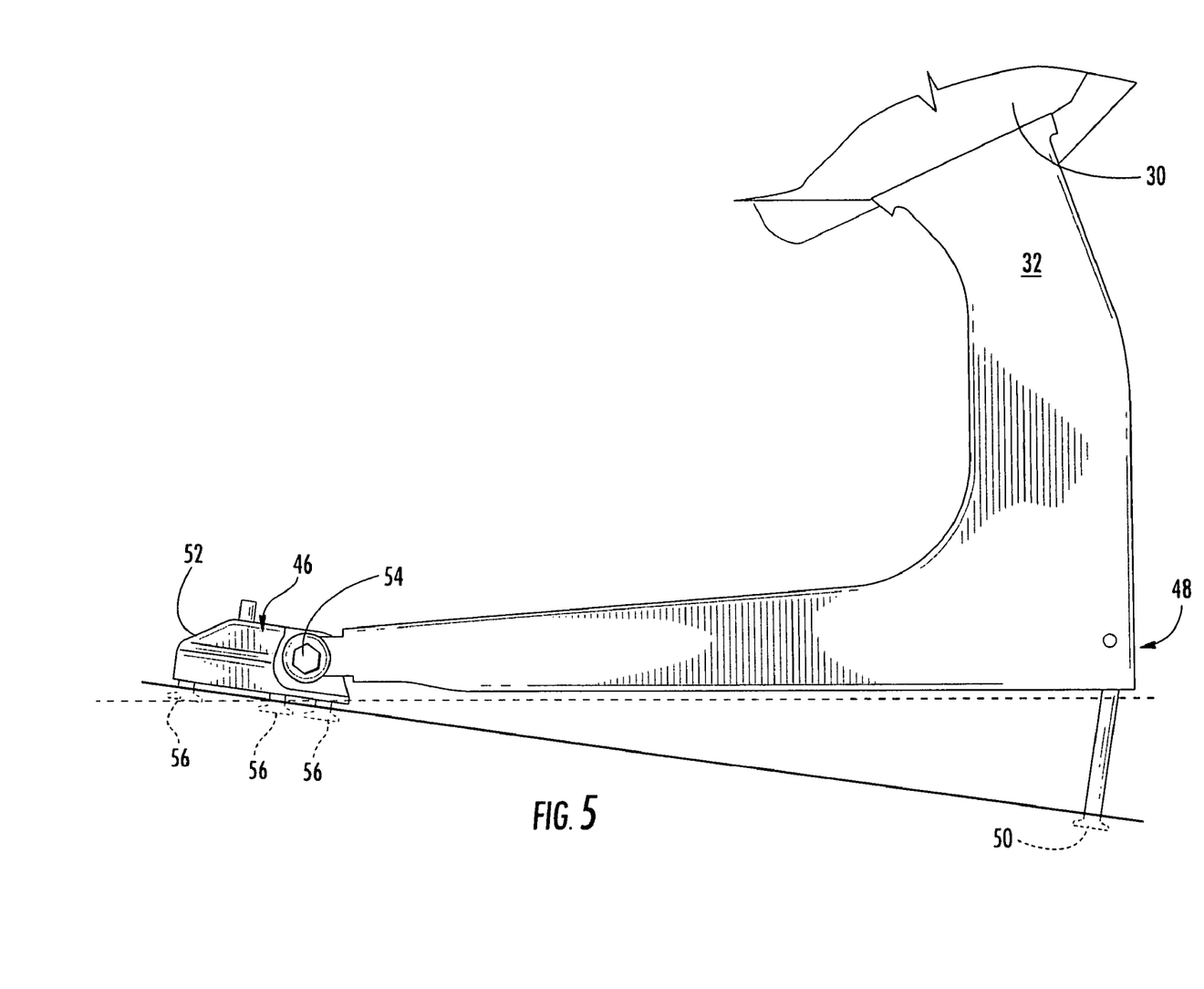
FIG. 5 is an enlarged side view of the seat of FIG. 1 with the deck in a deformed condition.

FIGS. 4 and 5 depict the position of the leg 32 in the initial phase of a crash (or a test simulating a crash). In this situation, the deck 36 tends to deform so that it takes up a "rolled" or "twisted" position away from the one of the relatively rigid legs 32 or 34, depending on the direction of twist. During this initial phase, the front stud 50 extends downward from the leg 32 while remaining attached to the locking track 38 so that the seat set 10 will not become separated from the deck 36. The front stud 50 is mounted in the extendible stud assembly 48 so that it resists this extension in a controlled manner, which reduces the acceleration and forces on the seat set 10 and its occupants and accommodates the floor distortion without requiring the seat structure to distort. This has the effect of reducing the stresses in the seat structure and the locking tracks 38 and 38'.

Figures 6, 7:
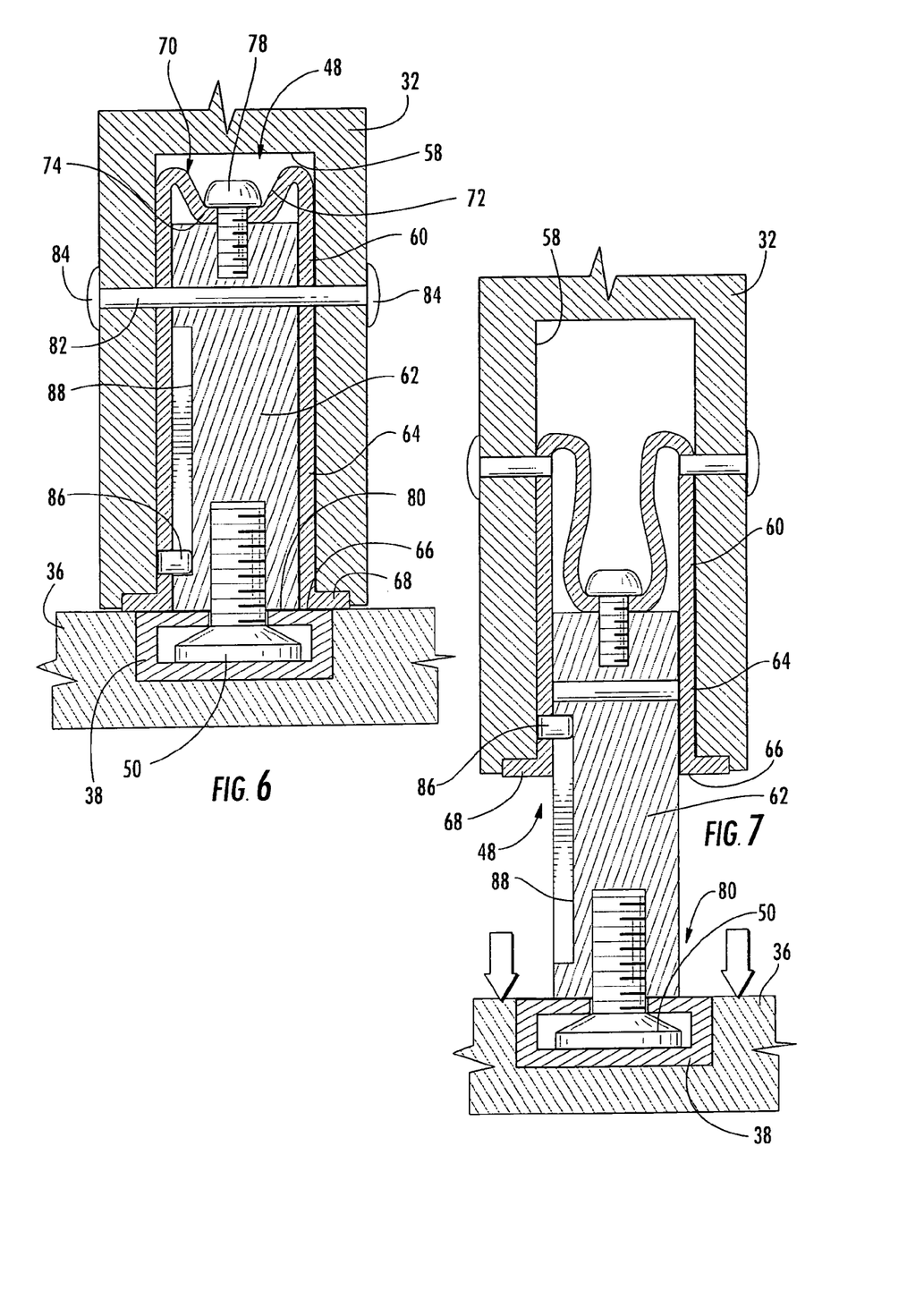
FIG. 6 is a cross-sectional view of an extendible stud assembly in a retracted position.
FIG. 7 is a cross-sectional view of the extendible stud assembly in an extended position.

FIG. 6 shows the details of how the front stud 50 is mounted to the seat set 10. The extendible stud assembly 48 is received in an opening 58 in the leg 32 and may be retained therein by interference fit, fasteners, or the like. The basic components of the extendible stud assembly 48 are an elongated, hollow housing 60 and a plunger 62. The housing 60 has a generally cylindrical sidewall 64, a open bottom end 66 with an outwardly-extending flange 68, and a closed upper end 70, which in the illustrated example is formed into a generally conical portion 72 connected to a generally flat portion 74. The plunger has an upper end 76 which is attached to the upper end 70 of the housing 60, for example using the illustrated machine screw 78, and a lower end 80 which receives the front stud 50. As an alternative, the front stud 50 could also be made integral with the plunger 62.

A laterally-extending shear pin 82 passes through coaxial holes in the leg 32, housing 60, and plunger 62. The shear pin 82 may be retained in place by forming its ends into heads 84 in the manner of a rivet. The diameter and material of the shear pin 82 are selected so that it will fail in shear when a preselected "pull" or downward load is applied to the plunger 62. The magnitude of this load is selected so that the plunger 62 will not extend under normal conditions.

The extendible stud assembly 48 includes a stop pin 86. In the illustrated example this is a short, laterally-extending pin which is carried by the housing 60 near the bottom end 66 thereof and which rides in a closed-ended vertical groove 88 formed in the side of the plunger 62. The specific structure used for this function is not of particular importance so long as it retains the plunger 62 in the housing 60 as described below.

FIG. 7 illustrates the extendible stud assembly 48 in an extended position, corresponding to the leg 32 as shown in FIGS. 2 and 5. In this condition, a downward or "pull" load in excess of the preselected amount has caused the shear pin 82 to fail, allowing the plunger 62 to move downward from the housing 60 (or put another way, allowing the seat set 10 with the attached housing 60 to move upward from the plunger 62), while the front stud 50 is still attached to the locking track 38. The seat set 10, or a portion thereof, is able to rotate upward or downward about the bolt 54 mounting the housing 52 to the leg 32. This movement causes deformation of at least the upper portion of the housing 60 as it is pulled downward. This deformation process resists the downward motion of the plunger 62, dissipating energy and lowering the average acceleration and reducing stresses on the leg 32. This in turn relieves preload on the seat set 10, thus lessening the probability of the seat set 10 or locking tracks 38 or 38' failing, or of the seat set 10 becoming separated from the locking track 38. As shown in FIG. 5, the entire extendible stud assembly 48 is able to pivot backwards about the stop pin 86. This avoids forward motion of the front stud 50 which might cause the front stud 50 to disengage the locking track 38.

During a subsequent phase of a crash, the aircraft will be subject to a deceleration as it comes to a stop. During this process, the extendible stud assembly 48 is able to operate in the opposite matter to that described above. In particular, the seat set 10 tends to continue forward as the aircraft stops because of its momentum, resulting in a forward "pitching" motion and a downward load on the housing 60. This load causes deformation of at least the upper portion of the housing 60 which dissipates energy as the plunger retracts inside the housing 60.

The stop pin provides a positive connection which does not interfere with the operation of the deformable housing 60, but prevents the motion past a defined limit. This also ensures that the plunger 62 will not separate from the housing 60 even if the housing 60 itself or the connection of the plunger 62 thereto should fail.

Figure 8:
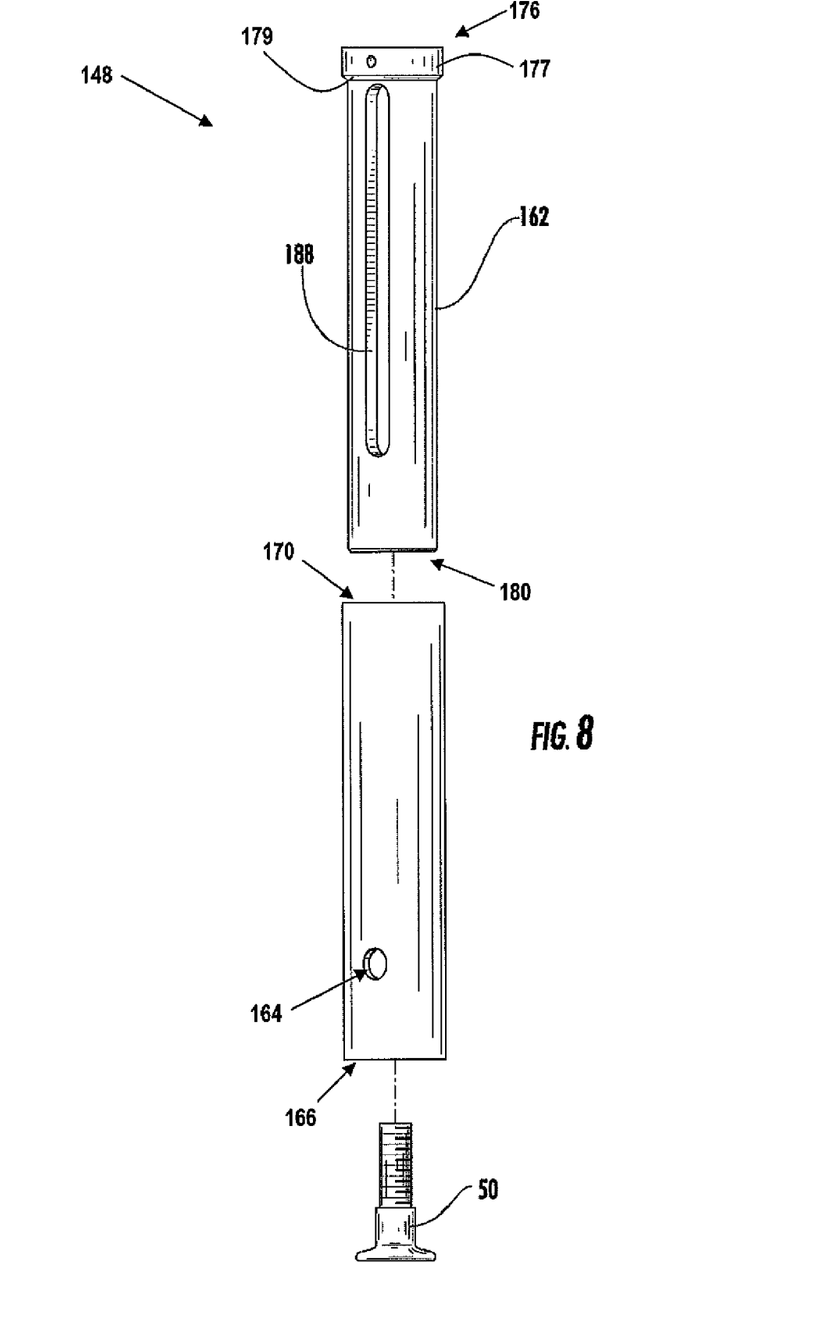
FIG. 8 is an exploded perspective view of an alternative extendible stud assembly.

FIG. 8 illustrates an alternative extendible stud assembly 148. The basic components of the extendible stud assembly 148 are an elongated, hollow housing 160 and a plunger 162. The housing 160 has a generally cylindrical sidewall 164, an open bottom end 166, and an open top rim 170. A closed-ended vertical groove is 188 formed in the side of the plunger 162.

The plunger 162 has an upper end 176 which is formed into an enlarged-diameter head 177 with a chamfered lip 179 that rests on the top rim 170 of the housing 160, and a lower end 180 which receives the front stud 50. The head 177 has an outer diameter "D1" which is greater than the inside diameter "D2" of the housing 160.

Figure 9:
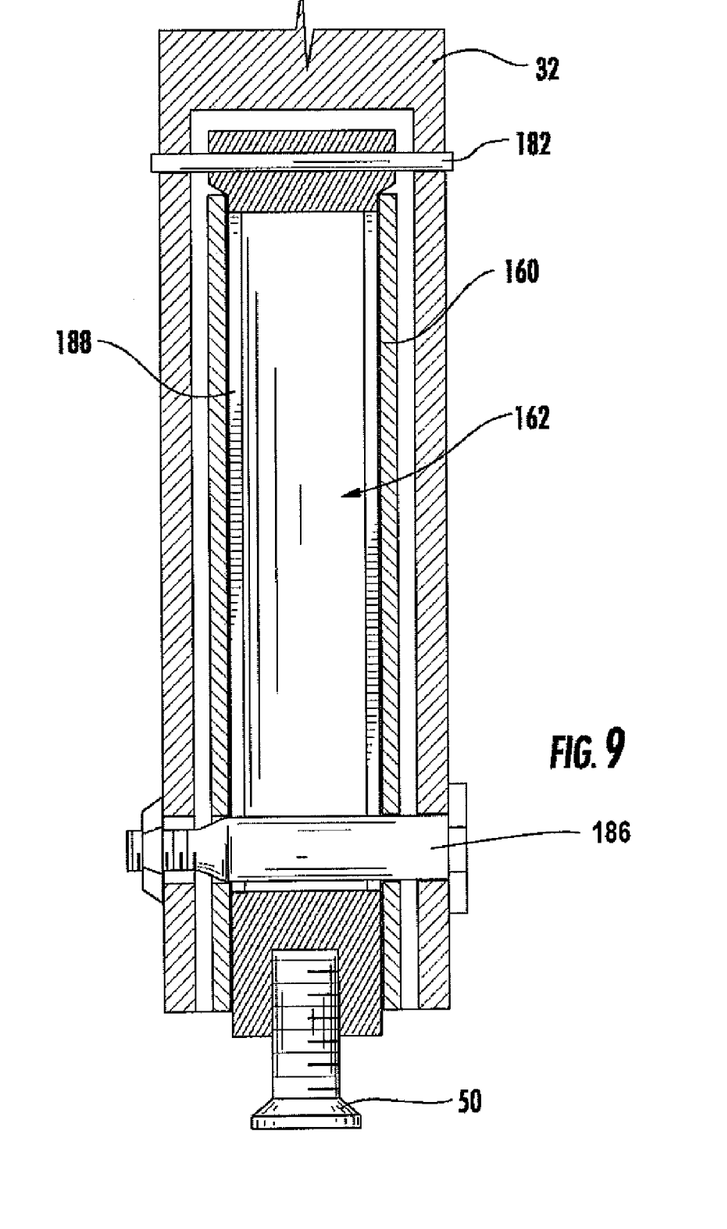
FIG. 9 is a cross-sectional view of the extendible stud assembly of FIG. 8 in a retracted position.

The extendible stud assembly 148 is received in the leg 32 and may be retained therein by interference fit, fasteners, or the like. As shown in FIG. 9, a laterally-extending pivot pin 186 passes through coaxial holes in the leg 32 and housing 160, and the slot 188 in the plunger 162. This allows the entire extendible stud assembly 148 to pivot about the pivot member 186. In the illustrated example the pivot pin 186 is formed by a standard bolt nut; however other types of fasteners or cylindrical components could be substituted therefor.

A laterally-extending shear pin 182 passes through coaxial holes in the leg 32, the housing 160, and the head 177 of the plunger 162. The diameter and material of the shear pin 182 are selected so that it will fail in shear when a preselected "pull" or downward load is applied to the plunger 162. The magnitude of this load is selected so that the plunger 162 will not extend under normal conditions.

Figure 10:
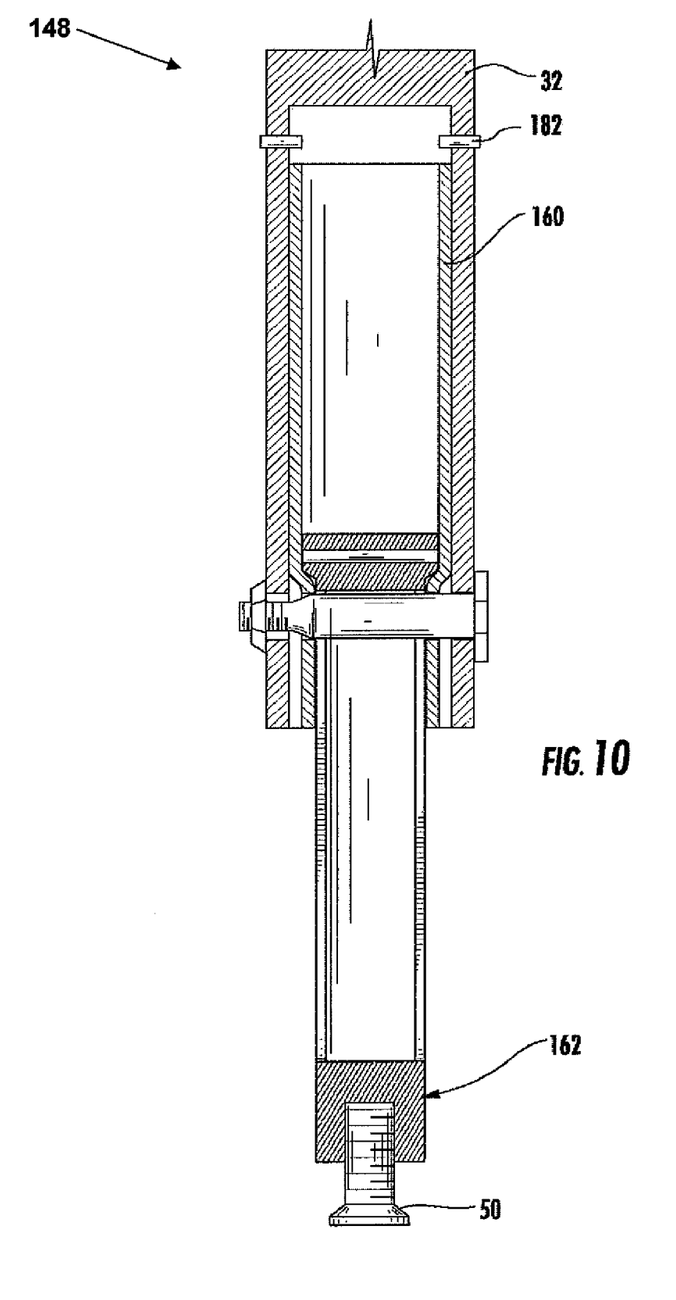
FIG. 10 is a cross-sectional view of the extendible stud assembly of FIG. 8 in an extended position.

FIG. 10 illustrates the extendible stud assembly 148 in an extended position, corresponding to the leg 32 as shown in FIGS. 2 and 5. In this condition, a downward or "pull" load in excess of the preselected amount has caused the shear pin 182 to fail, allowing the plunger 162 to move downward from the housing 160 (or put another way, allowing the seat set 10 with the attached housing 160 to move upward from the plunger 162), while the front stud 50 is still attached to the locking track 38. The seat set 10, or a portion thereof, is able to rotate upward or downward about the bolt 54 mounting the housing 52 to the leg 32. The head 177 of the plunger 162 causes plastic deformation of the housing 160 as the plunger 162 is pulled downward. This deformation process resists the downward motion of the plunger 162, dissipating energy and lowering the average acceleration and reducing stresses on the leg 32. This in turn relieves preload on the seat set 10, thus lessening the probability of the seat set 10 or locking tracks 38 or 38' failing, or of the seat set 10 becoming separated from the locking track 38. As shown in FIG. 5, the entire extendible stud assembly 48 is able to pivot backwards about the stop pin 86. This avoids forward motion of the front stud 50 which might cause the front stud 50 to disengage the locking track 38.

During a subsequent phase of a crash, the aircraft will be subject to a deceleration as it comes to a stop. During this process, the extendible stud assembly 148 is able to operate in the opposite matter to that described above. In particular, the seat set 10 tends to continue forward as the aircraft stops because of its momentum, resulting in a forward "pitching" motion and a downward load on the housing 160. Frictional resistance between the head 177 and the interior of the housing 160 dissipates energy as the plunger 162 retracts inside the housing 60. Alternatively, the return motion of the extendible stud assembly 148 can be arrested completely by design to retain the seat set 10 in the stud-extended position throughout the crash event. This has the effect of reducing seat stresses and reducing seat forward pitching during the crash.

The engagement of the pivot pin 186 in the slot 188 provides a positive connection which does not interfere with the operation of the deformable housing 160, but prevents the motion past a defined limit. This also ensures that the plunger 162 will not separate from the leg 32 even if the housing 160 itself or the connection of the plunger 162 thereto should fail.

Figure 11:
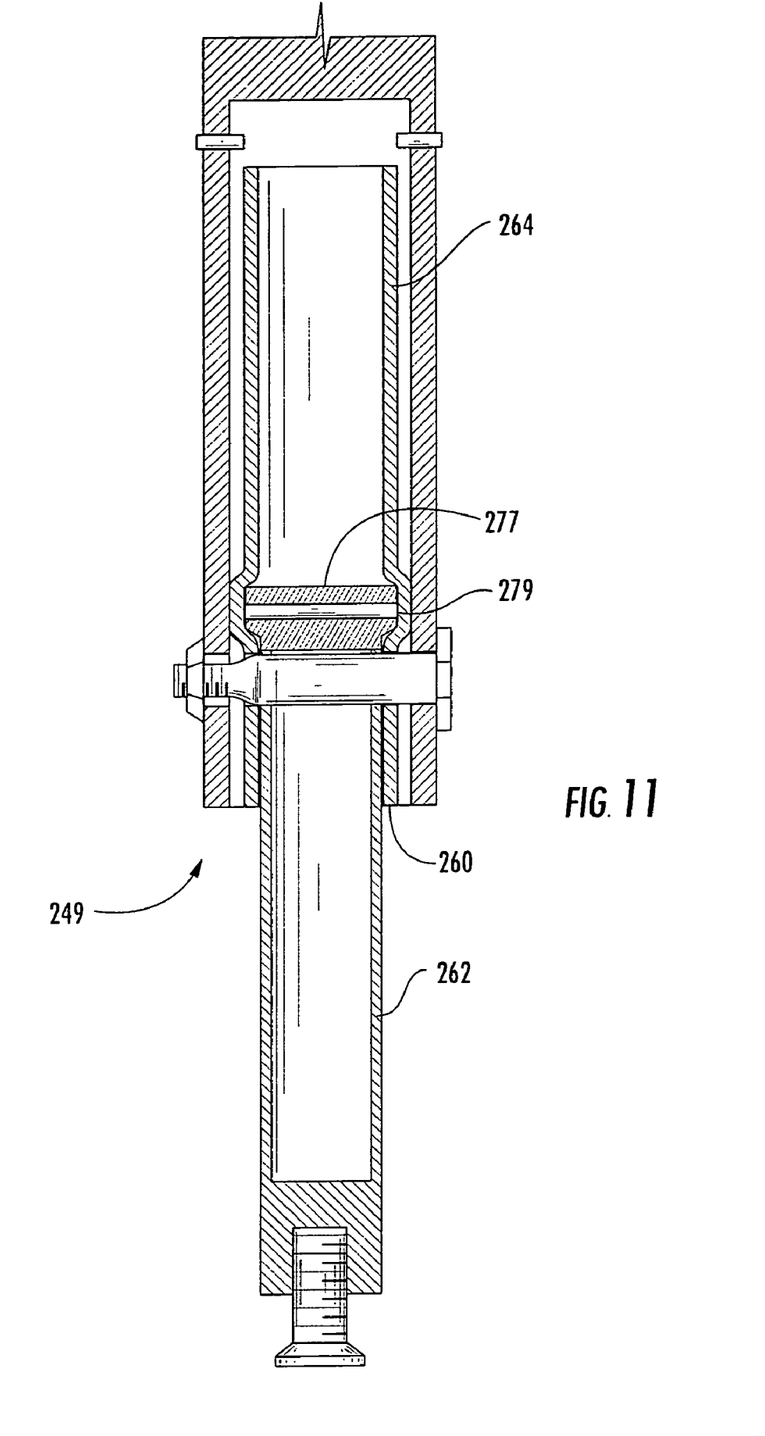
FIG. 11 is a cross-sectional view of an alternative extendible stud assembly including an anti-return feature in an extended position.

It is also possible to intentionally arrest the return motion of the extendible stud assembly in order to retain the seat 10 in the stud-extended position throughout the crash event. This has the effect of reducing seat stresses and reducing seat forward pitching during the crash. For example, FIG. 11 illustrates an extendible stud assembly 249 which is substantially similar in construction to the extendible stud assembly 148 and includes an elongated, hollow housing 260 defining a generally cylindrical sidewall 264, and a plunger 262 with an enlarged head 277 having a downwardly-facing with chamfered lip 279.

The material, dimensions, and hardness of the housing 260 are selected such that only elastic deflection of the sidewall 264 will take place as the plunger 262 extends during a crash event, as described above. The upper portion of the sidewall 264 will relax to its starting diameter after the head 277 passes by, as depicted in FIG. 11. Because of the absence of a chamfered lip on the upper portion of the head 277, a larger force will be required to cause the plunger 262 to retract than to extend. With appropriate tailoring of the materials and dimensions of the plunger 262 and housing 260, this force can be selected high enough that the plunger 262 will not retract once it has extended during a crash event.

Figure 12:
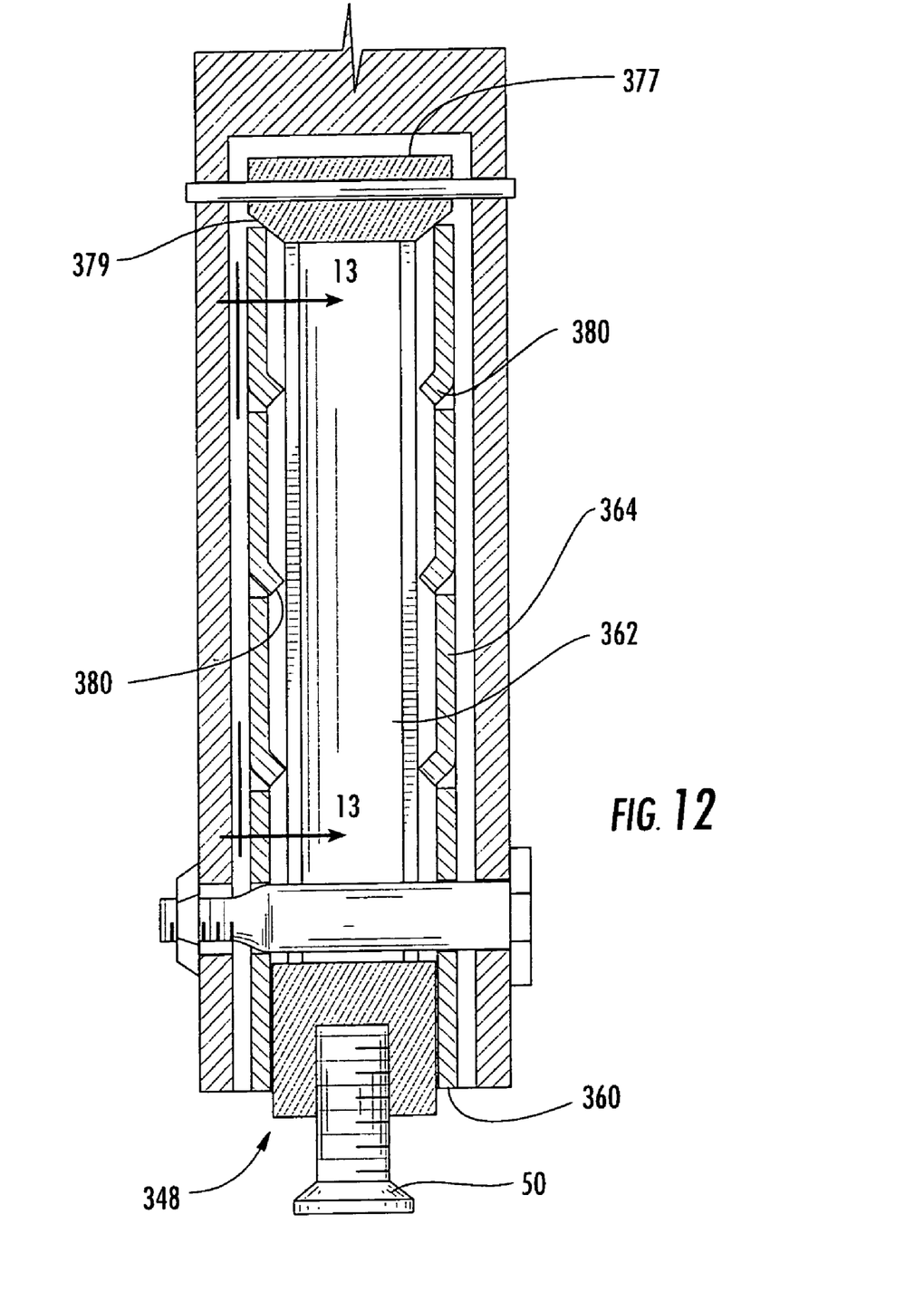
FIG. 12 is cross-sectional view of another alternative extendible stud assembly including an anti-return feature in a retracted position.
Figure 13:
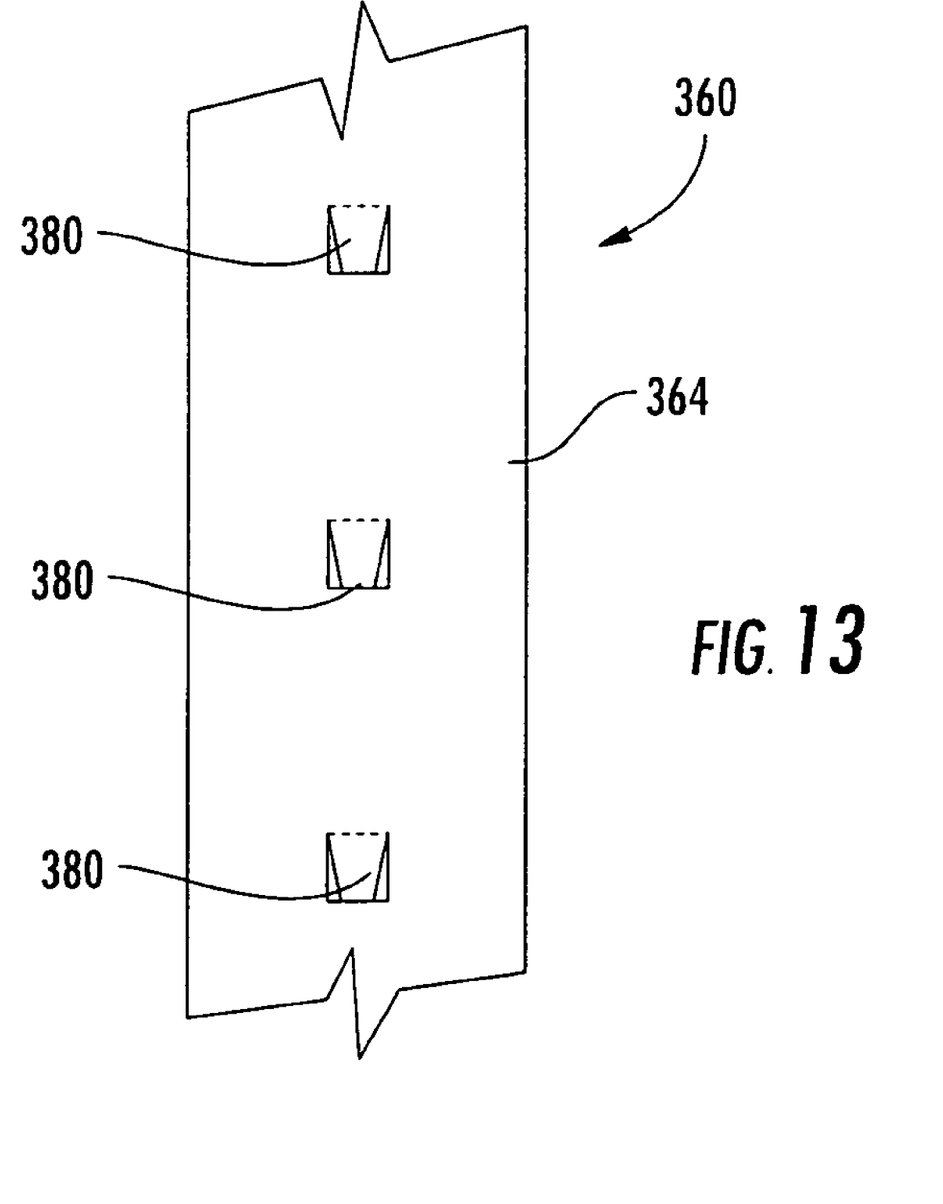
FIG. 13 is a view taken along lines 13-13 of FIG. 12.
Figure 14:
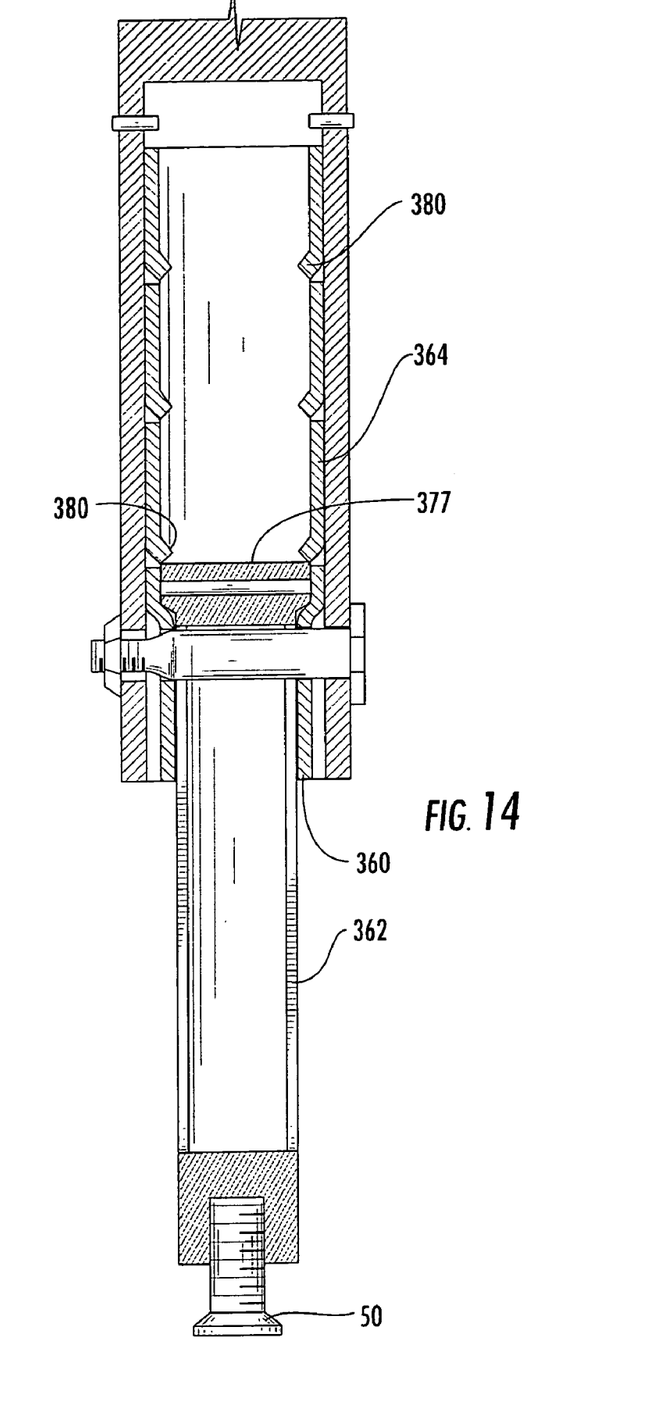
FIG. 14 is cross-sectional view of the extendible stud assembly of FIG. 12 in an extended position.

FIGS. 12 and 13 illustrate another alternative extendible stud assembly 348 having an anti-return feature. The basic construction is substantially similar to the extendible stud assembly 148 and includes an elongated, hollow housing 360 defining a generally cylindrical sidewall 364, and a plunger 362 with an enlarged head 377 having a downwardly-facing with chamfered lip 379. A plurality of inwardly-extending and generally downwardly-facing resilient tabs 380 are formed in the sidewall 264, for example by using a punching operation. During a crash event, the head 377 of the plunger 362 is able to pass by the tabs 380 by deflecting them outward. Once the plunger 362 is extended, as shown in FIG. 14, the tabs 380 tend to extend at least partially back to their original positions. In this position, upward motion of the plunger 362 is strongly resisted or prevented completely as the head 377 engages one or more of the tabs 380.

It should be noted that other mechanisms may be used to provide an anti-return feature. For example, one or more teeth (not shown) having a ratcheting action to allow extension of the plunger but not retraction, may be provided on the plunger or the housing.

The foregoing has described a seat mount having energy-dissipating features, and a seating arrangement incorporating such a mount. While specific embodiments of the present invention have been described, it will be apparent to those skilled in the art that various modifications thereto can be made without departing from the spirit and scope of the invention. Accordingly, the foregoing description of the preferred embodiment of the invention and the best mode for practicing the invention are provided for the purpose of illustration only and not for the purpose of limitation, the invention being defined by the claims.

What is claimed is:

1. An extendible stud assembly for a passenger seat comprising:
   a housing for being attached to said seat;
   a movable plunger carried by said housing and including a locking stud adapted for engaging a locking track, wherein said housing is constructed such that motion of said stud relative to said housing under an applied load causes deformation of said housing which resists said movement; and
   a means for resisting return motion of said plunger once said plunger has extended from said housing.

2. The extendible stud assembly of claim 1 further comprising a shear pin which engages said housing and said plunger to prevent motion of said plunger, wherein the material and dimensions of said shear pin are selected to permit failure thereof at a predetermined load greater than a load required to cause deformation of said housing.

3. The extendible stud assembly of claim 2 wherein said material and dimensions of said shear pin are selected to fail when a load of about 400 Kg load is applied to said plunger.

4. The extendible stud assembly of claim 1 wherein said housing comprises
   an elongated hollow member having a sidewall with a closed top end and an open bottom end; and
   an upper end of said plunger is attached to said housing.

5. The extendible stud assembly of claim 4 wherein said top end of said housing includes at least one generally conical portion connected to a substantially flat portion which contacts said plunger.

6. The extendible stud assembly of claim 1 wherein:
   said housing comprises an elongated hollow member having a sidewall with an open top rim and an open bottom end; and
   said plunger has upper and lower ends and an enlarged head disposed at said upper end, wherein a portion of said plunger is received inside said housing, and said head is disposed above said top rim.

7. The extendible stud assembly of claim 6 wherein said head has a outside diameter greater than an inside diameter of said housing.

8. The extendible stud assembly of claim 1 further comprising means for preventing motion of said plunger outside of a predetermined range.

9. The extendible stud assembly of claim 1 further comprising a stop pin attached to said housing and received in an elongated slot in said plunger, such that said stop pin allows motion of said plunger within a predetermined range, and prevents motion of said plunger beyond said predetermined range.

10. The extendible stud assembly of claim 1 further comprising a pivot pin extending laterally through housing and received in an elongated slot in said plunger, such that said pivot pin allows motion of said plunger within a predetermined range, and prevents motion of said plunger beyond said predetermined range.

11. The extendible stud assembly of claim 1 wherein:
   said housing comprises an elongated hollow member having a sidewall with an open top rim and an open bottom end;
   said plunger has upper and lower ends and an enlarged head disposed at said upper end, wherein a portion of said plunger is received inside said housing, and said head is disposed above said top rim; and
   said housing is adapted to elastically deflect outward during downward motion of said plunger, and to return inward towards its original dimensions so as to resist subsequent upwards motion of said plunger.

12. The extendible stud assembly of claim 1 wherein said means for resisting return motion comprise a plurality of inwardly and generally downwardly-extending resilient tabs carried by a sidewall of said housing.

13. A passenger seat, comprising:
   a frame including a pair of spaced-apart legs for being attached to a deck of a vehicle;
   an upwardly-extending seat back carried by said frame;
   a seat bottom for supporting a passenger;
   a track fastener attached to a first end of each of said legs, each of said track fasteners including a downwardly-projecting locking stud adapted to engage a locking track, wherein the stud comprises a movable plunger carried by a housing that deforms under an applied load; and
   a means for resisting return motion of said plunger once said plunger has extended from said housing.

14. The passenger seat of claim 13 further comprising a shear pin which engages said housing and said plunger to prevent motion of said plunger, wherein the material and dimensions of said shear pin are selected to permit failure thereof at a predetermined load greater than a load required to cause deformation of said housing.

15. The passenger seat of claim 13 wherein said housing comprises an elongated hollow member having a sidewall with a closed top end and an open bottom end; and
   an upper end of said plunger is attached to said housing.

16. The passenger seat of claim 15 wherein said top end of said housing includes at least one generally conical portion which contacts said plunger.

17. The passenger seat of claim 13 further comprising means for preventing motion of said plunger outside of a predetermined range.

18. The passenger seat of claim 13 further comprising a stop pin attached to said housing and received in an elongated slot in said plunger, such that said stop pin allows motion of said plunger within a predetermined range, and prevents motion of said plunger beyond said predetermined range.

19. The passenger seat of claim 13 wherein:
   said housing comprises an elongated hollow member having a sidewall with an open top rim and an open bottom end; and
   said plunger has upper and lower ends and an enlarged head disposed at said upper end, wherein a portion of said plunger is received inside said housing, and said head is disposed above said top rim.

20. The passenger seat of claim 19 wherein said head has a outside diameter greater than an inside diameter of said housing.

21. The passenger seat of claim 13 further comprising a pivot pin extending laterally through housing and received in an elongated slot in said plunger, such that said pivot pin allows motion of said plunger within a predetermined range, and prevents motion of said plunger beyond said predetermined range.

22. The passenger seat of claim 13 wherein:
   said housing comprises an elongated hollow member having a sidewall with an open top rim and an open bottom end;

said plunger has upper and lower ends and an enlarged head disposed at said upper end, wherein a portion of said plunger is received inside said housing, and said head is disposed above said top rim; and said housing is adapted to elastically deflect outward during downward motion of said plunger, and to return inward towards its original dimensions so as to resist subsequent upwards motion of said plunger.

23. The passenger seat of claim 13 wherein said means for resisting return motion comprises a plurality of inwardly and generally downwardly-extending resilient tabs carried by a sidewall of said housing.

* * * * *